US006804403B1

(12) United States Patent
Wang et al.

(10) Patent No.: US 6,804,403 B1
(45) Date of Patent: Oct. 12, 2004

(54) REGION-BASED SCALABLE IMAGE CODING

(75) Inventors: Meng Wang, Vancouver (CA); Xue Dong Yang, Regina (CA); Li Qu, North Vancouver (CA); Brent Simon, North Vancouver (CA)

(73) Assignee: Digital Accelerator Corporation, Vancouver (CA)

( * ) Notice: Subject to any disclaimer, the term of this patent is extended or adjusted under 35 U.S.C. 154(b) by 0 days.

(21) Appl. No.: 09/743,839

(22) PCT Filed: Jul. 15, 1999

(86) PCT No.: PCT/CA99/00641

§ 371 (c)(1),
(2), (4) Date: Apr. 23, 2001

(87) PCT Pub. No.: WO00/04721

PCT Pub. Date: Jan. 27, 2000

Related U.S. Application Data

(60) Provisional application No. 60/093,124, filed on Jul. 15, 1998.

(51) Int. Cl.[7] .................................................. G06K 9/36
(52) U.S. Cl. ........................ 382/240; 382/232; 382/239
(58) Field of Search .............................. 382/240, 232, 382/132, 239, 173; 375/240.27, 240.19

(56) References Cited

U.S. PATENT DOCUMENTS

| | | | |
|---|---|---|---|
| 5,412,741 A | 5/1995 | Shapiro | 382/232 |
| 5,563,960 A | 10/1996 | Shapiro | 382/239 |
| 5,748,903 A | 5/1998 | Agarwal | 395/200.77 |
| 5,764,807 A | 6/1998 | Pearlman et al. | 382/240 |

FOREIGN PATENT DOCUMENTS

| | | | | |
|---|---|---|---|---|
| CA | 1269444 | 5/1990 | | H04N/7/133 |
| CA | 2268191 | 4/1998 | | G06K/9/00 |
| EP | 0466475 | 1/1992 | | H04N/7/133 |
| WO | WO 97/01153 | * | 1/1997 | G06T/5/00 |
| WO | WO 97/38533 | 10/1997 | | H04N/7/30 |
| WO | WO 98/19273 | 5/1998 | | G06T/9/40 |
| WO | WO 00/04721 | 1/2000 | | H04N/7/26 |

OTHER PUBLICATIONS

Matokazi et al., "Image Enhancement of Chest Radiography Using Wavelet Analysis", IEEE, International Conference, vol. 3, Oct. 1996, pp. 1109–1110.*
Luo et al., "Face Location in Wavelet–Based Video Compression for High Perceptual Quality Videoconferencing", International Conference on Image Processing, vol. 2, Oct. 1995, pp. 583–586.*
Banham et al., Proc. Int. Conf. on Acoustics, Speech and Signal Processing 17:653–656, 1992.
Egger et al., IEEE International Conference on Acoustics, Speech and Signal Processing—Proceedings Conf. 21 pp. 2335–2338, May 1996.

(List continued on next page.)

Primary Examiner—Anh Hong Do
(74) Attorney, Agent, or Firm—Morrison & Foerster LLP

(57) ABSTRACT

A region-based system, method and architecture for encoding and decoding digital still images to produce a scalable, content-based, randomly accessible compressed bit stream is disclosed. According to the system raw image data is decomposed and ordered into a hierarchy of multi-resolution sub-images. Regions of interest are then determined. A region mask is defined to identify the regions of interest and then encoded. This data is then sorted on the basis of the magnitude of the multi-resolution coefficients to produce the scalable, content-based randomly accessible compressed bit stream.

29 Claims, 11 Drawing Sheets

OTHER PUBLICATIONS

Frajka et al., "Progressive Image Coding with Spatially Variable Resolution," Proceedings of the International Conference on Image Processing, US, Los Alamitos, CA: IEEE, pp. 53–56, ISBN: 0–8186–8184–5, Oct. 1997.

Gijbels et al., Proc. of the Intl. Conf. on Pattern Recognition 10:408–412, Nov. 1990.

International Search Report mailed on Nov. 17, 1999, for PCT patent application No. PCT/CA99/00641, 4 pages.

Kossentini et al., Embedded Quandtree Predictive Coder, ISO/IEC/JTC1/SC29/WG1/N666, Posted Nov. 1997 (http://www.itscj.ipsj.or.jp/sc29/open/29view/29n25391.pdf).

Said and Pearlman, "A New Fast and Efficient Image Codec Based on Set Partitionin in Heirarchial Trees," IEEE Transactions on CSVT, vol. 6, No. 3, Jun. 1996.

Taubman et al., EBCOT: Embedded Block Coding with Optimized Trunacation, ISO/IEC/JTC1/Sc29/WG1/N1020R, Posted Oct. 1998. Relevant pages: Ch. 4, Taubman (1999) JPEG2000 Verification Model VM3A, pp. 1–89 (http://citeseer.nj.nec.com/context/1128550/0).

Taubman, Proceedings of the 6th International Conference on Image Processing (1999) Kobe, Japan, 3:344–348.

Terminal Equipment and Protocols for Telematic Services—Information Technology—Digital Compression and Coding of Continuous–tone Still Images, ITU–T Recommendation T.81, Sep. 1992.

* cited by examiner

Combinatorial Approach       Geometric Approach

```
111001111111111              111001111111111
111000111111111              111000111111111
111011111111111              111011111111111
111111111111111              111111111111111
111111100001111              111111100001111
111111100001111              111111100001111
001111000000111              001111000000111
110010000000111              110010000000111
111111100111010              111111100111010
```

(a) Linear Scanning (b) Region Shrinking

REGION-BASED SCALABLE IMAGE CODING

This application claims the benefit of provisional application No. 60/093,124 filed Jul. 15, 1998.

FIELD OF THE INVENTION

The present invention relates generally to image coding and more particularly to compression and decompression of scalable and content-based, randomly accessible digital still images.

BACKGROUND OF THE INVENTION

The fast growth of Internet and digital multimedia applications has created a consistent and growing demand for new image coding tools that reduce the usually large and cumbersome raw image data files into a compressed form. Compactness of the resulting bit-stream, however, is no longer the only requirement asked of developers when devising new coding tools. End users and their applications are increasingly demanding features like scalability, error robustness and content-based accessibility.

Photographs or motion picture film are two-dimensional representations of three-dimensional objects viewed by the human eye. These methods of recording two-dimensional versions are "continuous" or "analog" reproductions. Digital images are discontinuous approximations of these analog images made up or a series of adjacent dots or picture elements (pixels) of varying color or intensity. On a computer or television monitor, the digital image is presented by pixels projected onto a glass screen and viewed by the operator. The number of pixels dedicated to the portrayal of a particular image is called its resolution i.e. the more pixels used to portray a given object, the higher its resolution.

A monotone image—black and white images are called "grayscale"—of moderate resolution might consist of 640 pixels per horizontal line. A typical image would include 480 horizontal rows or lines with each of these containing 640 pixels per line. Therefore, a total of 307,200 pixels are displayed in a single 640×480 pixels image. If each pixel of the monotone image requires one byte of data to describe it (i.e. either black or white), a total of 307,200 bytes are required to describe just one black and white image. Modern gray scale images use different levels of intensity to portray darkness and thus use eight bits or 256 levels of gray. The resulting image files are therefor correspondingly larger.

For color images, the color of each pixel in an image is typically determined by three variables: red (R), green (G), and blue (B). By mixing these three variables in different proportions, a computer can display different colors of the spectrum. The more variety available to represent each of the three colors, the more colors can be displayed. In order to represent, for example, 256 shades of red, an 8-bit number is needed. The range of the values of such a color is thus 0–255. The total number of bits needed to represent a pixel is therefor 24 bits—8 bits each for red, green, and blue, commonly known as RGB888 format. Thus, a given RGB picture has three planes, the red, the green, and the blue, and the range of the colors for each pixel in the picture is 0–16.78 million, or R×G×B=256×256×256. A standard color image of 640×480 pixels therefor, requires approximately 7.4 megabits of data to be stored or represented in a computer system. This number is arrived at by multiplying the horizontal and vertical resolution by the number of required bits to represent the full color range—640×480× 24=7,372,800 bits.

Standard, commonly available hardware, while increasingly fast and affordable, still finds files of this size slow and unwieldy. This is especially true in the case of interactive applications and Internet use. Interactive applications demand very fast multi-directional processing of multimedia data. Given their persistently large size, image files have been a rate limiting factor in the development of realistic, interactive computer applications. In the case of the Internet, end-users and applications are further limited by the slow pace of modems and other transmission media. For example, the amount of information currently capable of being transmitted over a telephone line in the interval of one second is restricted to 33,600 bits-per second due to the actual wires and switching functions used by the typical telephone company. Therefore, a single, full color RGB888 640×480 pixel page, with its 7,372,800 bits of data would take approximately three and one half minutes to transfer at this baud rate.

Many methods of compressing image data exist and are well known to those skilled in the art. Some of these methods are as "lossless" compression; that is, upon decoding and decompressing they restore the original data without any loss or elimination of data. Because their relative reduction ratios are small however, these lossless techniques cannot satisfy all the current demands for image compression technologies. Other compression methods exist that are nonreversible and known as "lossy". These nonreversible methods can offer considerable compression, but do result in a loss of data. In image files, the high compression rates are actually achieved by eliminating certain aspects of the image, usually those to which the human eye has limited or no sensitivity. After coding, an inverse process is performed on the reduced data set to decompress and restore a reasonable facsimile of the original image. Lossy compression techniques may also be combined with lossless methods for a variable mix of data compression and image fidelity.

Compactness of a compressed bit-stream is usually measured by the size of the stream in comparison to the size of the corresponding uncompressed image data. A quantitative measure of the compactness is the compression ratio, or alternatively, the bit-rate where:

compression ratio=(total bytes of the original raw image data)/ (total bytes required for compressed image)

and bit-rate=(total bytes required for decompression)/(pixel number of the original image)

In general, the higher the compression ratio (or the lower the bit-rate), the higher the compactness of a compressed bit-stream. Compactness has been always a primary concern for all data compression techniques.

One of the most popular formats for compressed image files is the GIF format. GIF stands for "Graphic Image Format", and was developed by Compuserve to provide a means of passing an image from one dial-up customer to another, even across different computer hardware platforms. It is a relatively old format, and was designed to handle a palette of 256 colors—8 bit as opposed to 24 bit color. When developed, this was near state of the art for most personal computers.

The "GIF" format uses an 8 bit Color Look Up Table (sometimes called a CLUT) to identify color values. If the original image is an 8 bit, gray-scale photo, then the "GIF" format produces a compressed lossless image file. A gray scale image typically has only 256 levels of gray. The operative compression is accomplished by the "Run Length Encoding" (RLE) mechanism of compressing the information while saving a GIF file. If the original file were a 24 bit color graphic image, then it would first be mapped to an 8 bit CLUT, and then compressed using RLE. The loss would be in the remapping of the original 24 bit (16.7 million) colors to the limited 8 bit (256 colors) CLUT. RLE encoding would reproduce an uncompressed image that was identical to the remapped 8 bit image, but not the same as the original 24 bit image. RLE is not an efficient way of compressing an image when there are many changes in the coloration across a line of pixels. It is very efficient when there are rows of pixels with the same color or when a very limited number of colors is used.

The other de facto standard of still image formats is the JPEG format. JPEG stands for Joint Photographic Experts Group. JPEG uses a lossy compression method to create the final file. JPEG files can be further compressed than their GIF relations, and they can maintain more color depth than the 8 bit table used in the GIF format. Most JPEG compression software provides the user with a choice between image quality, and the amount of compression. At compression ratios of 10:1 most images look very much like the original, and maintain excellent full color rendition. If pressed to 100:1 the images tend to contain blocky image artifacts that substantially reduce quality. Unlike GIF, JPEG does not use RLE alone to compress the image, it uses a progressive set of tools to achieve the final file.

JPEG first changes the image from its original color space to a normalized color space (a lossy process) based on the luminance and chrominance of the image. Luminance corresponds to the brightness information while chrominance corresponds to hue information. Testing has indicated that the human eye is more sensitive to changes in brightness than changes in color or hue. The data is reordered in 8×8 pixel blocks using the Discrete Cosine Transform (DCT), and this too produces some image loss. It effectively re-samples the image in these discrete areas, and then uses a more standard RLE encoding (as well as other encoding schemes) to produce the final file. The higher the ratio of encoding, the more image loss, and the 8×8 pixel artifacts become more noticeable.

One of the requirements of evolving technologies is that they possess the characteristic/attribute of scalability. Scalability measures the extent to which a compressed bit-stream is capable of being partially decoded and utilized at the terminal end of the transmission. In meeting this need of progressive processing, scalability has become a standard requirement for the new generation of digital image coding technology. Typically, scalabilities in terms of pixel precision and of spatial resolution are, among others, two basic requirements for still image compression.

To achieve scalability while ensuring image fidelity, recent developments in image compression technology have incorporated multi-resolution decompositions based upon "wavelets". Wavelets are mathematical functions, first widely considered in academic applications only after the Second World War. The name wavelet is derived from the fact that the basis function—or the "mother wavelet" generally integrates to zero, thus "waving" about the x-axis. Other characteristics, like the fact that wavelets are orthornormal or symmetric, ensure quick and easy calculation of the direct and inverse wavelet transform i.e. especially useful in decoding.

Another important advantage to wavelet based transforms is the fact that many classes of signals or images can be represented by wavelets in a more compact way. For example, images with discontinuities and images with sharp spikes usually take substantially fewer wavelet basis functions than sine or cosine based functions to achieve the same precision. This implies that wavelet-based method has potential to get a higher image compression ratios. For the same precision, the images that are reconstructed from wavelet coefficients look better than the images obtained using a Fourier (sine or cosine) transform. This appears to indicate that the wavelet scheme produces images more closely sympathetic to the human visual system.

A wavelet transforms the image into a coarse, low resolution version of the original and a series of enhancements that add finer and finer detail to the image. This multi-resolution property is well suited for networked applications where scalability and graceful degradation are required. For example, a heterogeneous network may include very high bandwidth parts as well as 28.8 modem connections and everything in between. It would be nice to send the same video signal to all parts of the network, dropping finer details and sending a low resolution image to the parts of the network with low bandwidth. Wavelets are well suited to this application by wrapping the coarse, low resolution image in the highest priority packets which would reach the entire network. The enhancements belong in lower priority packets that may be dropped in lower bandwidth parts of the network.

This multi-resolution property of the coded image also supports graceful degradation in a noisy communications channel such as a wireless network or a sick network. The high priority packets containing the low resolution base image would be retransmitted while the enhancements would be discarded if errors occur.

Content-based coding and accessibility is a further, new dimension within the realm of image compression. The ability to specify and manipulate specific regions of an image is not supported by previously disclosed coding techniques such as JPEG. Nor is content-based random accessibility a claimed functionality within any of new wavelet based technologies. End user applications that require this feature include multimedia database query, Internet server-client interaction, image content production and editing, remote medical diagnostics, and interactive entertainment, to name a few.

Content-based query to multimedia databases requires the support of the mechanism that locates those imagery materials where an interested object is present. Content-based hyperlink to Internet or local disk sites makes desired objects within an image serve as entry points for information navigation. Content-based editing enables a content producer to manipulate the attributes of the image materials in an object-oriented or region-based manner. Content-based interaction allows a digital content subscriber or a remote researcher to selectively control the image information transmission based on their regions of interest. In short, this content-based accessibility allows semantically meaningful visual objects to be used as the basis for image data representation, explanation, manipulation, and retrieval.

SUMMARY OF THE INVENTION

It is an object of the present invention to provide region-based coding in image compression. In accordance with an aspect of the instant invention there is provided a region-based method for encoding and decoding digital still images to produce a scalable, content accessible compressed bit stream comprising the steps: decomposing and ordering the raw image data into a hierarchy of multi-resolution sub-images; determining regions of interest; defining a region mask to identify regions of interest; encoding region masks for regions of interest; determining region masks for subsequent levels of resolution; and scanning and progressively sorting the region data on the basis of the magnitude of the multi-resolution coefficients.

In accordance with a further aspect of the instant invention there is provided an apparatus for the region-based encoding and decoding of digital still images that produces a scalable, content accessible compressed bit stream comprising: a means of decomposing and ordering the raw image data into a hierarchy of multi-resolution sub-images; means of determining regions of interest; means of defining a region mask to identify regions of interest; means of encoding region masks for regions of interest; means of determining region masks for subsequent levels of resolution; and a means for scanning and progressively sorting the region data on the basis of the magnitude of the multi-resolution coefficients.

In accordance with yet a further aspect of the instant invention there is provided a region-based system for encoding and decoding digital still images that produces a scalable, content accessible compressed bit stream and comprises the steps: decomposing and ordering the raw image data into a hierarchy of multi-resolution sub-images; determining regions of interest; defining a region mask to identify regions of interest; encoding region masks for regions of interest determining region masks for subsequent levels of resolution; and scanning and progressively sorting the region data on the basis of the magnitude of the multi-resolution coefficients

BRIEF DESCRIPTION OF THE FIGURES

The present invention will be better understood when considered in conjunction with the following figures and description in which like terms are used to indicate like features.

DETAILED DESCRIPTION OF PREFERRED EMBODIMENTS

Figure 1:
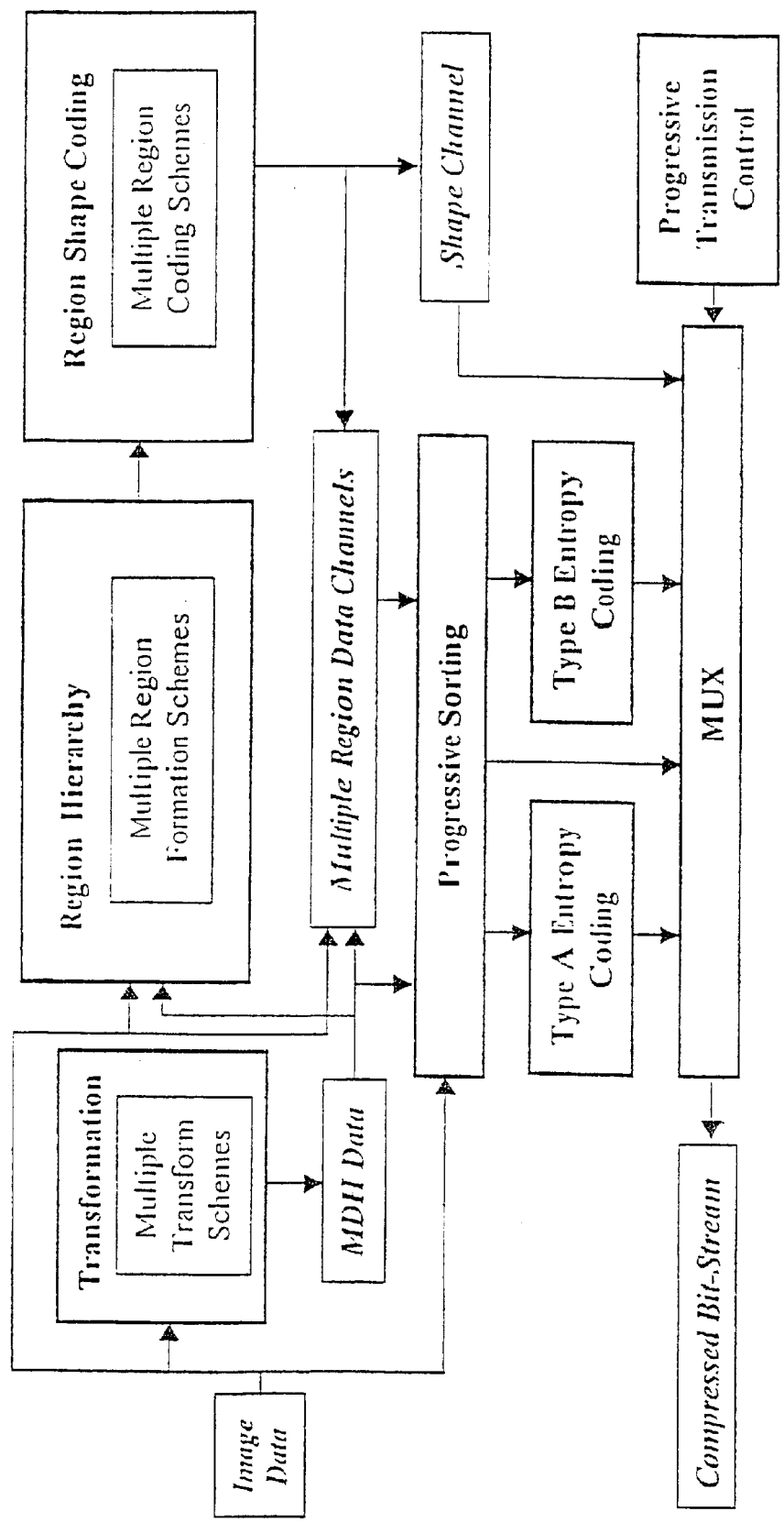
FIG. 1 is a detailed multi-path flow representation of the instant compression system and architecture.

FIG. 1 presents the overall architecture of the method and system for image data compression. In the preferred embodiment of the invention the raw image data enters the system as a bitmap image, undergoes the system of the present invention and exits as a compressed bitstream.

The first step in the compression encoding process is the transformation or decomposition of the raw data into a multiresolution decomposition hierarchy or MDH. The preferred embodiment of the present invention applies a discreet wavelet transform to achieve this decomposition, The reader will appreciate that other transforms are available and can be equally well utilized in the present invention. Further, this resolution-based decomposition need not necessarily be performed to accomplish the content accessible compression of raw image data. The present invention is based on a modular architecture capable of processing data in many different formats.

After the multiresolution decomposition, the next stage of the preferred embodiment is the region formatting and coding of the MDH data. The reader will note that this step may be applied to raw image data, or data that has been transformed into a multi-resolution hierarchy using a variety of techniques. This step of the system is broken into two components, the formation, or determination of the Regions Hierarchy and the subsequent coding of these region shapes. This data forms the Multiple Region Data Channels that enters the next stage in the system of the present invention.

After the data has been coded on the basis of its "regional" priorities, the data must once again be sorted to preserve scalability for the end user. The progressive sorting of the "regionalized" data is the system's unique and novel method to efficiently and compressibly organize the data to preserve the fidelity of the image, its scalability and the content based accessibility.

After the sorting stage of the system is completed, entropy coding of the data is then performed. Entropy coding is a lossless method of data compression well known in the art. It is based on methods of statistical prediction and further contributes to the compact nature of the final data stream.

Finally, a multiplexing or MUX module is included to manage the flow of different types of data resulting from the previous steps of the process. The multiplexer of the present invention allows the user to set the "bit budget" of the data flowing to the deompressor by way of progressive transmission control. The requirement for this feature may be imposed by the limited resources available for transmission of the data, or those available to the end user for processing. After multiplexing the resulting, compressed bitstream can be transmitted through a variety of media to the decoding component of the invention.

Figure 2:
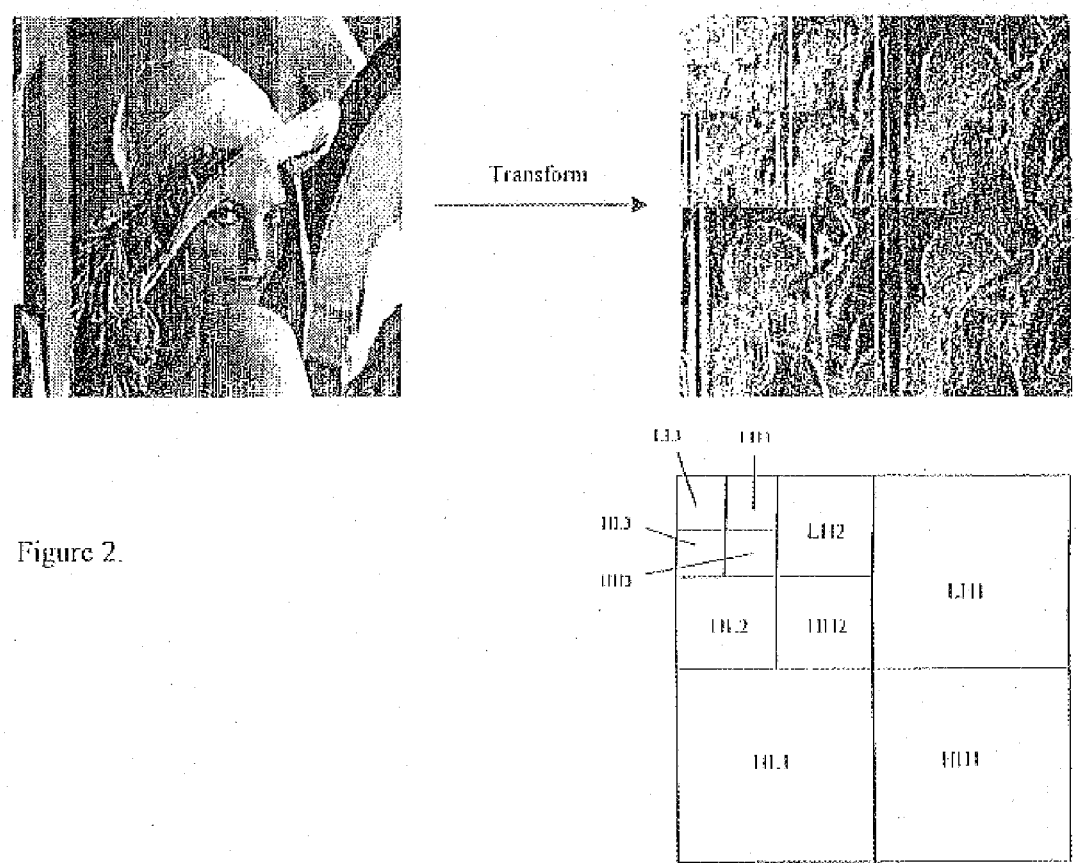
FIG. 2 is a representation of the multi-resolution decomposition hierarchy, obtained using a wavelet based transformation, of the image "Lena".

FIG. 2 is a graphic illustration of the first step in the encoding of the raw image data of the present invention. As mentioned previously, there are several different methods available to decompose or transform raw image data so that different levels of resolution may be organized. The reader will recall that this is to achieve the hierarchy desired for scalable and/or gracefully degraded transmission The different types of transforms currently available include wavelets, KL transforms, wavelet package transforms, lifting schemes, windowed Fourier transforms, and discrete cosign transforms. In the preferred embodiment of the present invention the particular wavelet used is based on a lifting scheme. It will be appreciated by one skilled in the art however that the architecture of the present invention supports other wavelets or perhaps other transforms designed for the particular purposes of an end user.

In FIG. 2 we see typical results from a multi-resolution based transformation of the data set Ix, y using the wavelet of the preferred embodiment. The test image "Lena" has been transformed into a hierarchy of data based on levels of resolution, presented in three spacial orientations. This is the "multi-resolution decomposition hierarchy" or MDH data set. The present invention performs, by way of default, either 3 or 5 different levels of decomposition. In FIG. 2. we further see that at each level of resolution, 3 spatial orientations are represented by HL, HH, and LH where; HL represents a high pass scan on the horizontal plane with a low pass scan on the vertical, HH denotes a high pass scan on both planes and LH is a low pass scan on the horizontal with a high pass on the vertical. An LL, or low pass scan in both planes, would present meaningless information at any particular level of resolution but may be interpreted by the subsequent resolution level in the hierarchy.

After the data has been decomposed and organized in this manner, the next step in the process is coding the data to allow for the content accessibility described above. To accomplish this objective, the present invention first defines a "region of interest", secondly, formulates a "mask" to describe it and then encodes that information so that it becomes part of the compressed data stream.

An important concept developed to perform this stage of present system is the notion of geometric progressive coding. When attempting to achieve region-based coding while preserving scalability it is imperative to associate the order V (the magnitude of the resolution coefficients—the MDH data) with the multiple region data (i.e., with relation R). This leads to a geometric approach to the coding set out in FIG. 3. In the prior art, the combinatorial approach (left), uses a sample value (a zero in the transform coefficient plane) to predict the possible occurrence of a group of zeros at a higher level of resolution. It is on this basis that the compactness in representation is achieved. At the same time, it will be appreciated that any error occurring during transmission at low levels of resolution will have increasingly severe repercussions at each level of prediction.

In the geometric approach (right) adopted in the present invention, representational compactness is achieved by using a geometric shape to cover a large set of samples (zeros) and then coding this shape. In this approach, regions of interest in the MDH are represented in the form of geometric objects, like regions and curves and compact codes are then formulated to describe these geometric objects. The compact coding of the geometric objects makes use of the leading-one curve C in FIG. 4. The advantages obtained by using this method of formulation and coding include the fine description of regions, the compact representation of these regions, and the robustness to the type of transmission errors described above.

Figures 3, 4:
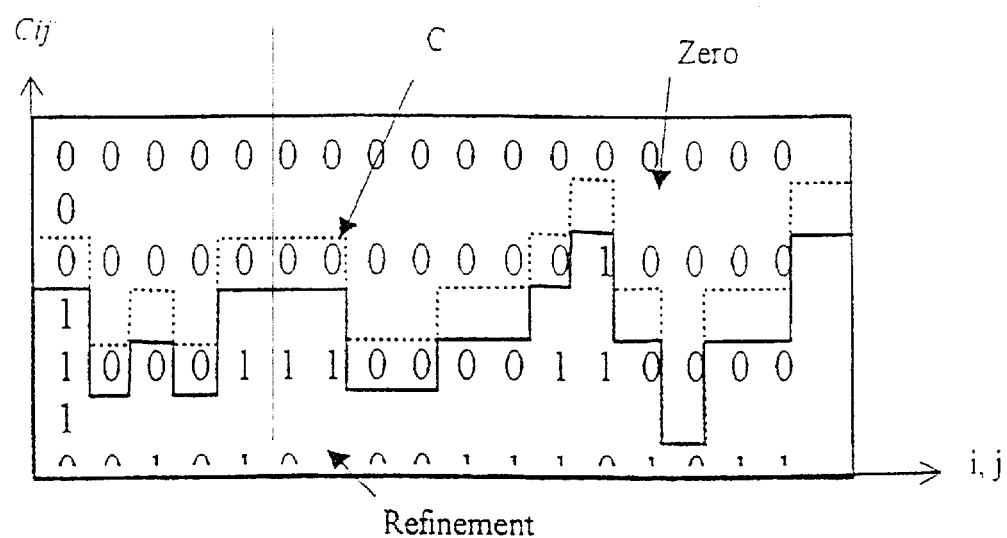
FIG. 3 is a schematic representation of the inventions "geometric" approach to the coding of regions of interest.
FIG. 4 is a graphic representation of the concept of "the leading one" as it applies to the coding of regions of interest.

Thus, given a subset of coefficient $\{C_{ij}\}$ in the MDH, the distribution of the absolute values of the coefficients, regardless of the order they are scanned, contains three parts (FIG. 4). The leading-one curve C is composed of the first non-zero bit of the binary representation of all coefficients when sought from the most significant bit. The refinement zone is composed of the binary bits of all coefficients following the leading one. The zero zone is composed of all the zeros preceding the leading one of all coefficients. Thus, if the number of total coefficients is n*N bits, and the area of the refinement zone is $|x|$ bits, and the area of the zero zone is $|0|$ bits, then $|x|+|0|=(n-1)*N$ bits since the length of the curve C is N.

In order to achieve lossless coding of this data the information for the curve C and for the refinement zone must be precisely recorded. The performance of an encoder in terms of compactness would then be determined by its ability to code the zero zone, or equivalently, to code the curve C. In order to achieve the scalability in terms of order V, the curve C is expected to be non-increasing in its height. This is achieved through a progressive partial sorting process that is described below.

Figure 5:
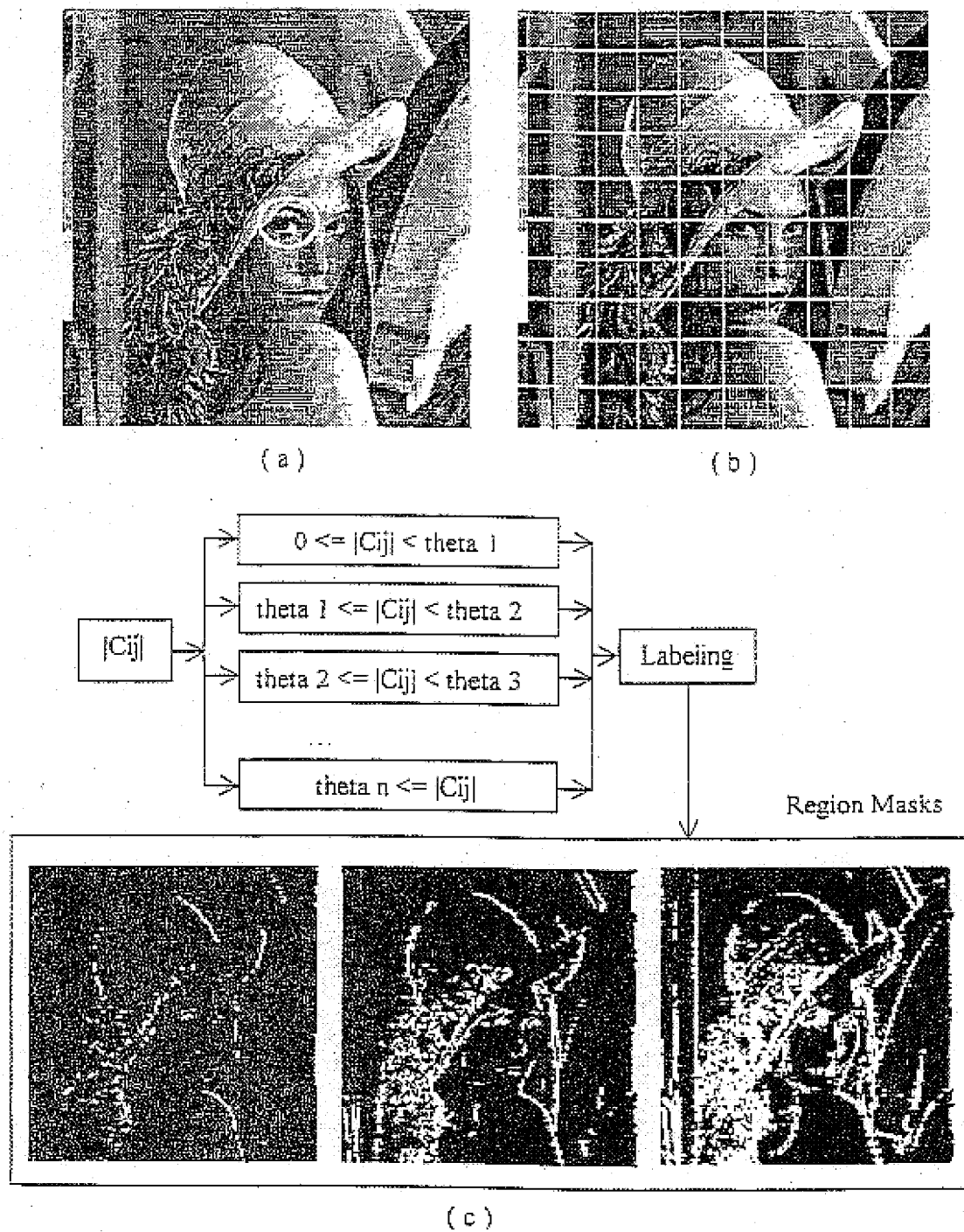
FIG. 5 is a representation of three types of region formation schemes as applied to the still image "Lena".

To return to beginning of the process by which the multiple region data is created, the preferred embodiment of the present invention contemplates three methods to determine a region of interest. In FIG. 5 we see that the system supports:

1. User-defined regions. In this scheme, the region is determined by either an interactive process (i.e. where the user specifies the region of interest with an input device like a mouse), or by an another application program. A "mask" is then formulated based on this user defined region. This method of region formulation is represented by FIG. 5a).

2. Tiling. In a tiling scheme, standard sized blocks of pixels are allocated and form the regions. In JPEG for example, 8×8 blocks can be considered as the regions specified via tiling. Tiling may also be an appropriate method of region formation when dealing with very large images like those generated in computer aided design and manufacture. The tiling method of region formulation is illustrated in FIG. 5b).

3. Automated Region Formulation. This automated process is represented by FIG. 5c). The task of the automated region hierarchy formulation is to segment the MDH data or the original image data into a hierarchy of geometric regions. In this invention a transformation-domain segmentation scheme is developed. In the preferred embodiment of this process, the MDH data is segmented into spatially disjoint regions by measuring their absolute values or by measuring the "region importance" where region importance is a group measure of the overall importance of all coefficients in a region of interest. In this invention we consider two types of region importance: average importance, and weighted importance. The average region importance is the mean value of the coefficient importance of all coefficients in that region, and the weighted region importance is the weighted average of the coefficient importance of all coefficients in the region.

The automated region formulation of the present invention is accomplished by using one of two segmentation algorithms. The first of these is a full logarithmic scheme where threshold values $2^{n-1}, 2^{n-2}, \ldots, 2^0$ are used sequentially to order the MDH data, where it is know that the maximum MDH coefficient $(|C_{ij}|)<2^n$.

The second segmentation algorithm is based on a partial logarithmic scheme. In this scheme, only certain powers of 2, determined by the expert user, are used as threshold values.

After thresholding the MDH data with either scheme, each spatial location on the MDH plane is marked with a unique label that relates to the corresponding threshold value. Thus, if "n" threshold values are used on a scheme, the entire MDH plane is marked with n+1 distinct labels. This set of labels forms the region masks.

In FIG. 5(c) we see the results of the automated segmentation of image Lena. The MDH coefficients generated during the multi-resolution decomposition stage thus fall into three ranges. In the preferred embodiment of the present invention the ranges are 0–15, 16–31 and 32–64.

Recalling that the MDH data structure contains multiple resolution levels and multiple spatial orientations, the segmentation of the MDH data could conceivably be achieved by applying a common mask set to all resolution levels and all orientations; applying different masks to different orientations while retaining a common mask for all resolution levels within each orientation; applying different masks to different resolution levels and retaining a common mask for all orientations at any give
n resolution level; or applying different masks to different resolutions and orientations.

In the preferred embodiment of the present invention, the first approach has been selected because of the self-similarity among different orientations. At any given resolution level, the boundary information (information related to the busy areas or those with high contrast) is contained in the sets HH1, HL1, and LH1. In general, since the sets HH, HL, and LH capture band-pass features in different orientations, none of them alone provides a complete description of boundaries at that resolution level. A proper determination of a boundary 'event' must occur when an event occurs in any one of the three orientations. The following operation is therefore used for the common importance test at the resolution level 1.

H1=max{HH1, HL1, LH1}.

That is to say, that importance of a region is determined by the maximum value occurring in any one of the three orientations at that location.

An alternative to this operation is H1=a*HH1,+b*HL1,+c*LH1, where a+b+c=1.

Other reasons for applying common masks for different resolutions and orientations include the self-similarity at different resolution levels and the computational efficiency of only one mask. That is computing a common mask is generally computationally cheaper than computing multiple masks.

The task of region shape coding is to find an accurate and compact code for the region masks produced in the region formation step. Both the compactness and accuracy of the shape code have a direct impact on the efficiency of the whole coding system. In the architecture of the present invention multiple, shape coding schemes are supported but in the preferred embodiment the following DCT-based region channel is used.

Figure 6:
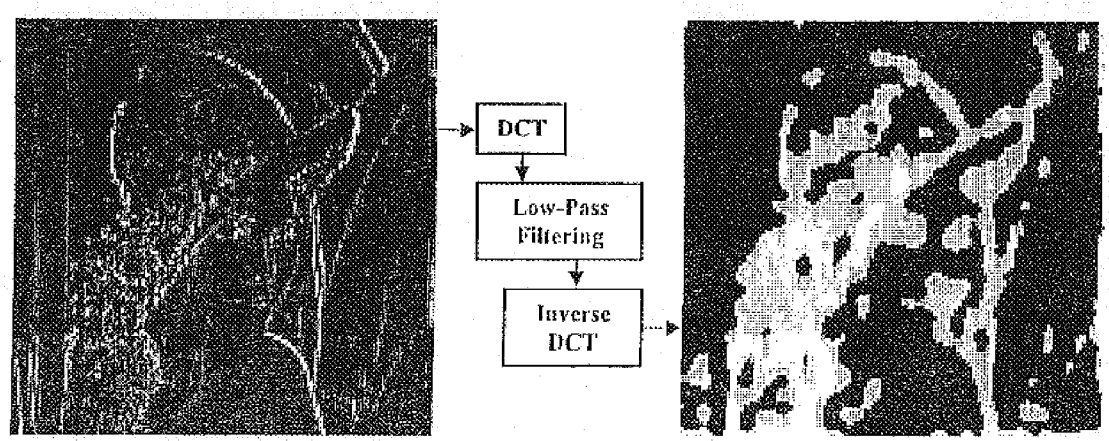
FIG. 6 is a representation of the coding of the regions of importance using a Discrete Cosign Transform (DCT) as applied to the still image "Lena".

In this scheme, a region mask is coded by its Fourier transform characteristics. By applying a low-pass filtering in the frequency domain, the global shape of multiple region masks can be encoded with high accuracy and with a small number of DCT coefficients. FIG. 6 illustrates a graphic example of the DCT-coded region masks as applied to the Lena image. By using the DCT transform to describe the mask, a substantial compression may be achieved.

Figure 7:
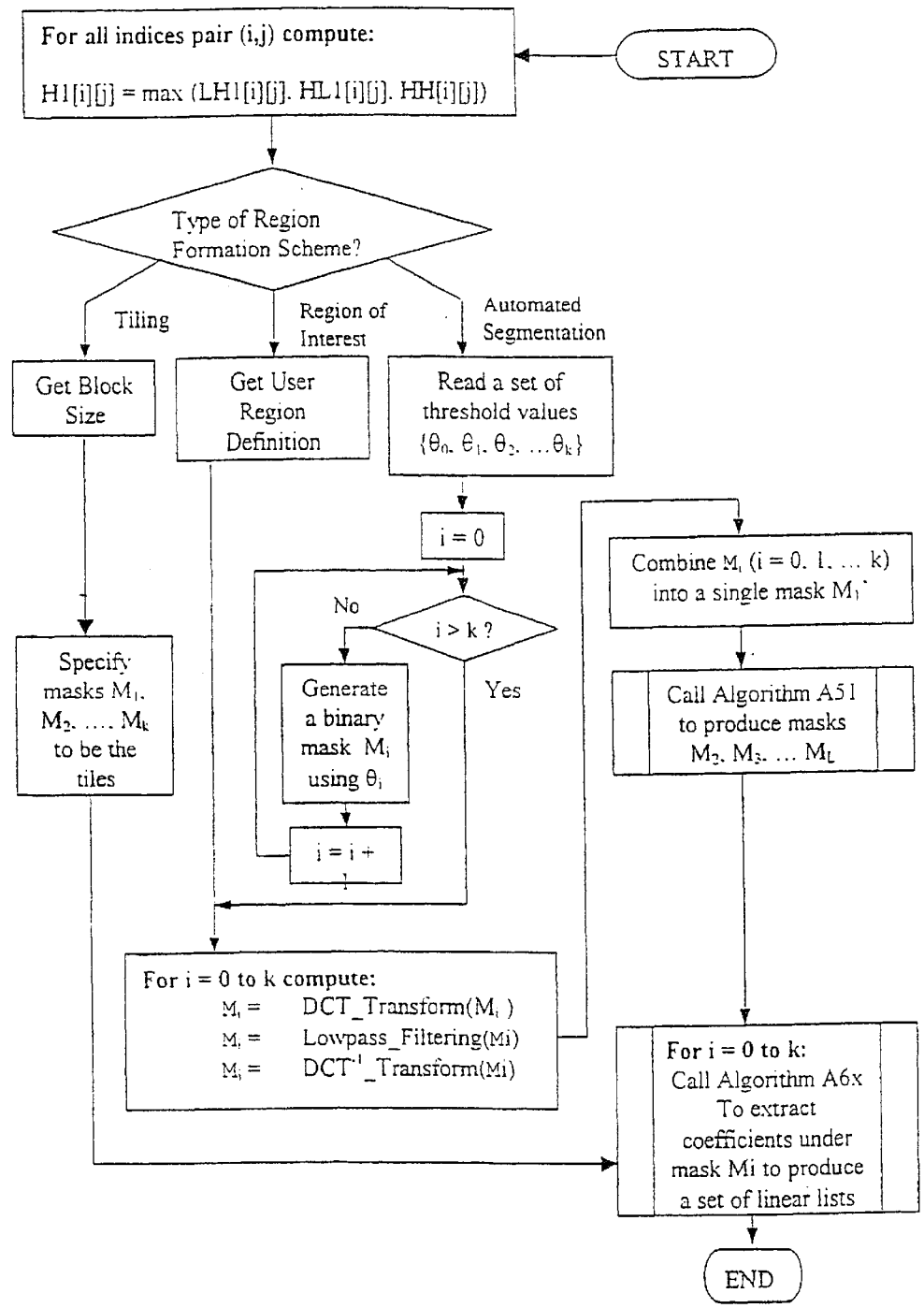
FIG. 7 is a flow diagram of the method of region hierarchy formation.

In the case of MDH data, only one DCT is used to generate the common mask at the highest resolution level. Other masks at lower resolution levels are achieved by down sampling. FIG. 7 illustrates the flow of data from the start of the region formulation stage through the coding of the region based data lists. This process, called Algorithm A50, is a method of bottom-up region hierarchy formation and includes the following steps:

(1) Calculate H1=max{LH1, HL1, HH1}, i.e.,

For k=1 to N: H1[k]=max(LH1[k], HL1[k], HH1[k]);

(2) Apply the region formation scheme to the common importance mask H1 to get a partition mask M1.
(3) Apply a low-pass filter to the DCT transformed mask M1 to get $M_1'$
(4) Use Down-sample the $M_1'$ to get masks M2, M3, . . . , $M_L$ at lower resolution levels (see algorithm A51 below).
(5) Apply the masks {$M_1'$, M2, . . . , $M_L$} to respective coefficient layers to segment the MDH into regions.

Figure 8:
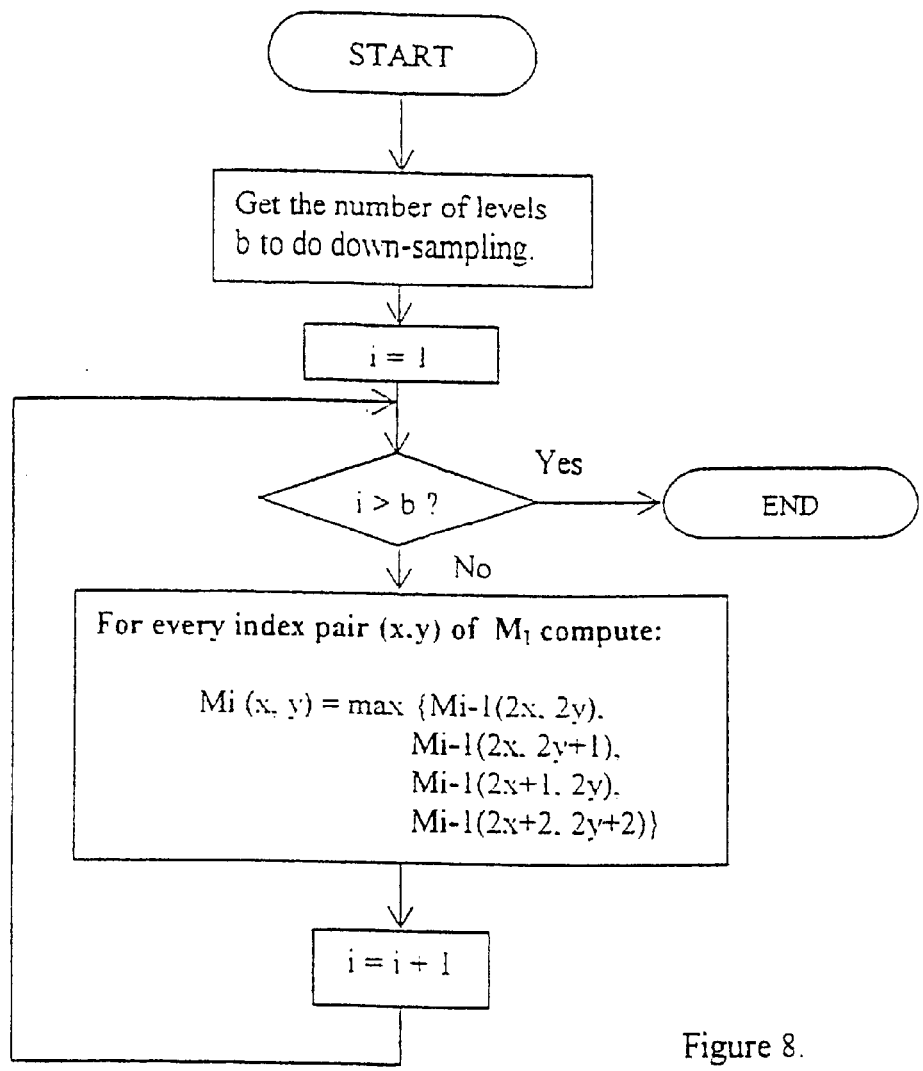
FIG. 8 is a flow diagram of the operation of algorithm A51 and the down sampling of region masks for subsequent resolution levels.

After step (3) above, the process by which the mask at the highest resolution level ($M_1$) is converted for use at lower resolution levels is performed by Algorithm A51, illustrated in FIG. 8.

Algorithm A51: Mask Down Sampling

Assume theta 1>theta 2>theta 3. Assume regions in M1 are labeled by theta values.

For (1=2, 3, . . . , b)
  For (all x and y of Mi)

$Mi(x, y)=\max\{Mi-1(2x, 2y), Mi-1(2x, 2y+1), Mi-1(2x+1, 2y), Mi-1(2x+2, 2y+2)\}$ While there are other methods by which to obtain the masks for the lower resolution levels, the down sampling algorithm (A51) given above precisely preserves the shape of regions at different resolution levels. Further, the above algorithm is computationally efficient.

Referring again to FIG. 1, the data has now passed through both the multiresolution decomposition and the region formulation and coding. At this stage the data has been reorganized on the basis of its graphic content but while the region segmentation process preserves the shape of regions at different resolution levels for all orientations, it does not preserve the value range of coefficients in corresponding regions at different levels and orientations. In other words, the relation R is inherited at different resolution levels and for all orientations, but the order V has, in general, not been precisely preserved. The task of progressive sorting is to re-establish the order V for all region channels.

The first step in the progressive sorting of the data is the scanning of the regions generated by the region formation and coding. As this data is scanned, a corresponding list of the MDH coefficients is created as they are encountered in the scanning process. It will be obvious to one skilled in the art that, depending upon the nature of the data to be scanned and converted into a linear list, efficiencies may be obtained by determining the optimum method of scanning the region data.

Generally speaking two types of scanning orders are contemplated; linear scanning and scanning based on a principle of "region shrinking". The preferred embodiment of the present invention uses a software switch to determine which of the two scanning strategies to undertake. This switch characterizes the nature of the data and then implements the appropriate strategy.

Figure 9:
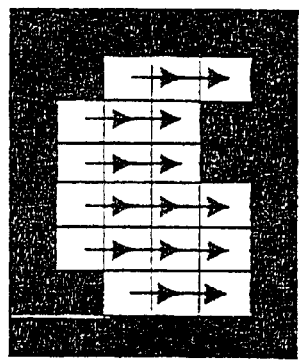
FIG. 9 is a representation of two different methods of scanning the region-encoded data.
Figure 9:
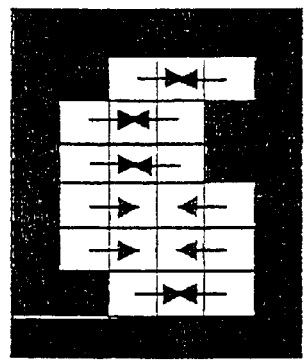

The first method of scanning the data generated in the region formation and coding is a simple linear analysis and listing of each coefficient. In this strategy, the coefficients are scanned beginning at the left most position of the top row of the region data and continuing row by row, down to the rightmost location of the bottom row. This strategy, as applied to a particular region, is illustrated in FIG. 9(a). While the linear scanning strategy is easy to implement, a major problem of this method is that it may destroy the descending or ascending order inherent in the data and thus jeopardize the compactness of the final, resulting bit-stream. This is true in the case of mountain ridge landscapes or similarly contoured shapes. For regions with fine patterns and mild changes in value, however, linear scanning can be comparatively efficient.

The second strategy for scanning the region-based coefficients is one based on the principle of region shrinking. This method is illustrated in FIG. 9(b) and is set out, mathematically, in Algorithm A62 below.

Algorithm A62.

Input: label L, mask [m][n], inBuf [m][n]; Output: outbuf [N].

```
Step 1.    K = 0;
           J0 = min {J: mask [I][J] = L};
           J1 = max {J: mask [I][J] = L};
Step 2.    While (J0 <= J1) do
           {
Step 2.1.      For (J=J0; J<=J1; J++){
                   While((Find I0 = left {I: mask [J][I] = L}) = true)do
                   {
                       Find I1 = right {I: mask [J][I] = L});
                       Append inBuf [J][I0] to outBuf [K++];
                       Mask [J][I0] = NIL;
                       If (I1 <> I0) {
                           Append inBuf [J][I1] to outBuf [K++];
                           Mask [J][I1] = NIL;
                       }
                   }
               }
Step 2.2.      (Update J0 and J1.)
               J0 = min {J: mask [J][I] = L};
               J1 = max {J: mask [J][I] = L};
           }
```

Figure 10:
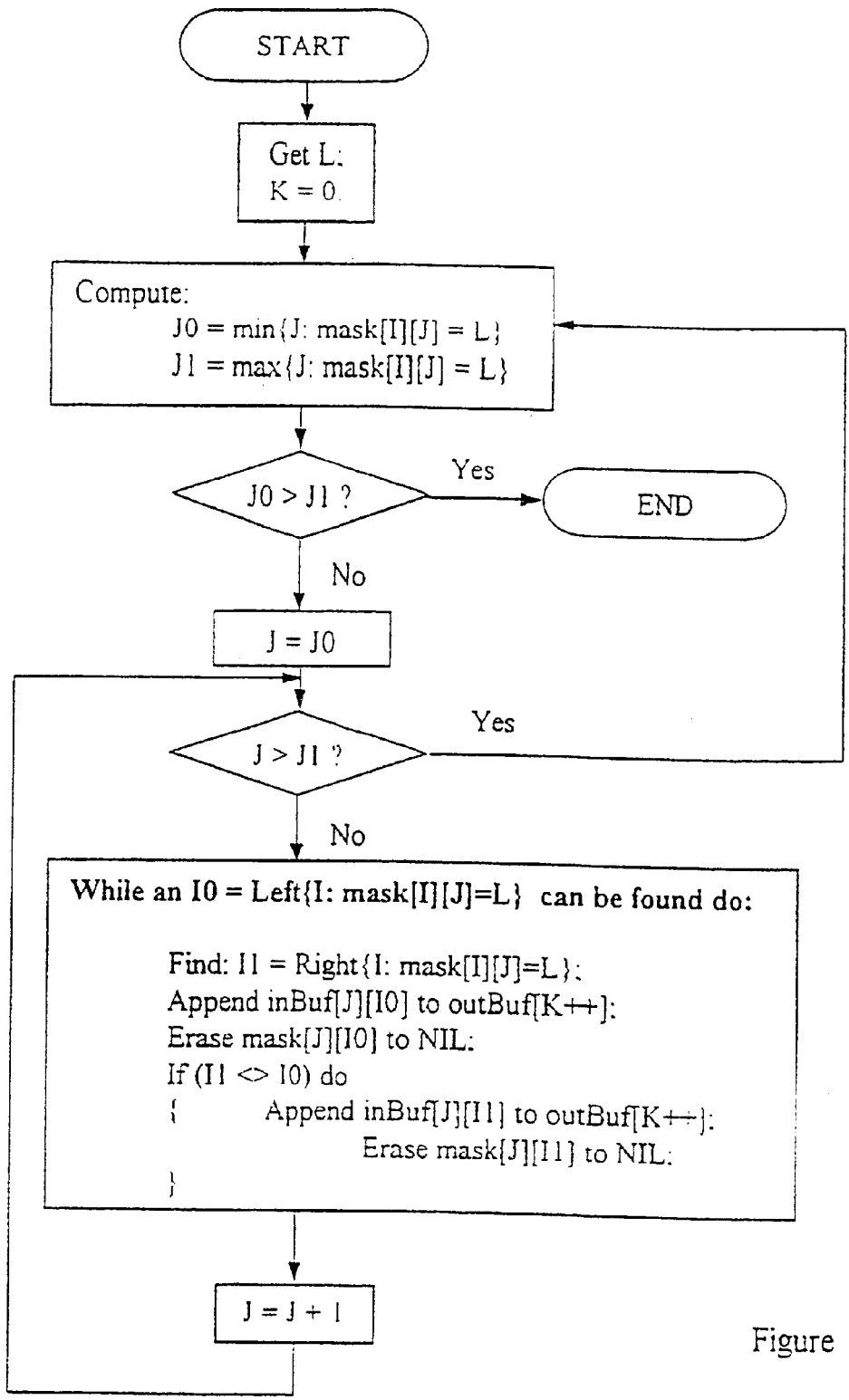
FIG. 10 is a flow diagram of a preferred method of scanning the region data using the region shrinking method.

FIG. 10 further illustrates the region shrinking process. For many cases such as mountain ridge landscape, this region-shrinking method of scanning can effectively and efficiently preserve the magnitude order in the data.

Whatever the scanning order is used to produce a linear list L for a region R, sorting is necessary in order to establish the order V. In the present invention, partial ordering up to the level of the leading-one curve is undertaken. Therefor, given a list L={C1, C2, Cm}, i.e. the generated list of decomposition coefficients, implement the following progressive coding algorithm:

Algorithm A620. Progressive Sorting

Step 1. For every item Ci in L, output the n-th msb(Ci),

Step 2. For those items with msb=1, output the values following the msb, and remove them from L;

Step 3. Let n=n−1 and go to Step 1.

This algorithm partially, not fully, sorts the list "L" up to the powers of 2. It is a progressive process to the extent that the output data list can be truncated at any given point but the decoder has received the most valuable information. Finally, it does not expand the list L: for complete, lossless sorting of L, the overall length of the sorted output is the same as L.

The algorithm A620 encounters inefficiencies when many items possess significantly small values. In this event, a remarkable amount of bit-budget is spent on recording the 0's preceding the leading 1 of each item's binary representation. The following algorithm improves this performance by determining and using a threshold value "b" to segregate these low value coefficients from those with higher values.

Algorithm A621. Bi-Partition Progressive Sorting

Step 1. For a predetermined 0<=b<=n, check for every Ci in L on whether $|Ci|<2^b$, output to L1 for, those items with greater-than-threshold values and to L2 for those with smaller values;

Step 2. For those items in L1, apply algorithm A620, starting with n;

Step 3. For those items in L2, apply algorithm A620, starting with b.

There are two basic requirements on the progressive sorting. (1). When the output bit-stream of the sorting process is decoded, it should produce the data in the descending order of V. (2) When the bit-stream is truncated at any point such that only partial data is reconstructed, the information amount in the reconstructed data should be maximized.

Entropy Coding

Again referring to FIG. 1, it can be seen that the next stage in the system is the entropy coding of the data. Entropy coding is a lossless method of data compression well known in the art. It is based on the inherent nature of binary code and the repetition of like strings of data. It is based on a method of prediction. In the present invention, two different methods of entropy encoding have been used because of the statistical nature of the two types of data resulting from the progressive sorting of the present invention. Type B data is that which forms the leading-one curve while Type A data is for all of the data in the refinement zone beneath the leading one curve. As may be seen from Figure Multiplexing The function fair of the multiplexing in the encoder system and the de-multiplexing in the decoder system provides the encoder and the decoder with an interactive means for the flexible control of the bit-rate and the quality of the compressed images.

The interactivity in bit-budget control is reflected by the fact that both the encoder and the decoder have the control to the bit-budget determination and allocation process. A base bit-budget (BBB) is specified to and used by the multiplexer to determine the total number of bits of a compressed bit-stream. In the demultiplexing process, a decoding bit-budget (DBB) can be used to further selectively prune the bit-stream before the decoding.

Figure 12:
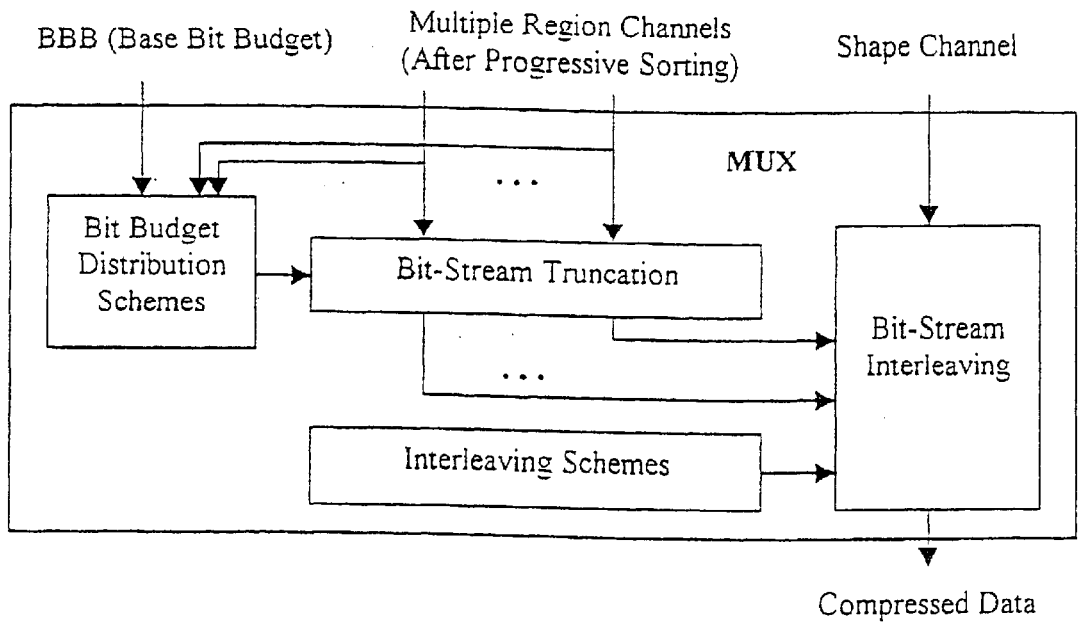
FIG. 12 is a flow diagram of the internal architecture of the multiplexer of the compression system.

The functions of the multiplexer are illustrated in FIG. 12 and include (1) given the base bit-budget (BBB) for encoding the entire image, determining the bit-budget for each resolution level and region channel.

Figure 11:
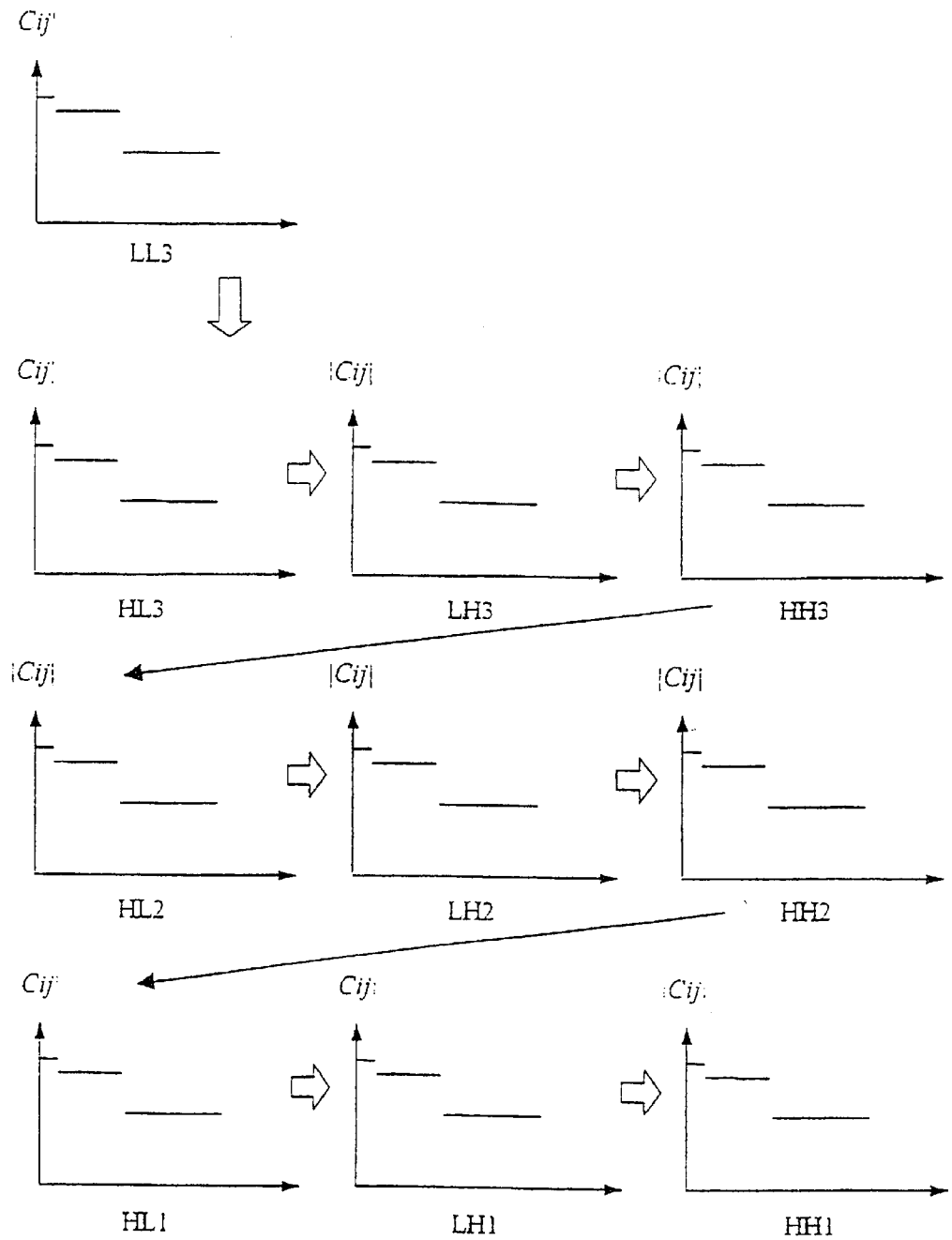
FIG. 11 is a detailed flow diagram of the order in which data is packed within the multiplexer on the compression side of the system.

(2) interleaving the data from different channels into a single bit-stream. Following the truncation, the sorted, truncated, data from different regions, orientations, and resolution levels are packed together to produce the final bit-stream. The default order for packing the data, illustrated in FIG. 11 is:

a. The data at different resolution levels are packed from the lowest resolution to the highest resolution, i.e., in the order of Level 5→Level 4→Level 3→Level 2→Level 1.

b. Within each resolution level, no preferred order is specified to the three spatial orientations. By default, the data are scanned in the order of HL→LH→HH.

c. Within a particular orientation at a given resolution level, regions are scanned from the highest region label to the lowest label.

After a compressed bit stream has been created, the preferred embodiment of the present invention contemplates a decoding process that is able to recreate the image. Depending upon the bit budget and the steps taken during the creation of the compressed bit stream, the original image may be restored in complete fidelity to the raw image data or alternatively, with some loss of information.

Figure 13:
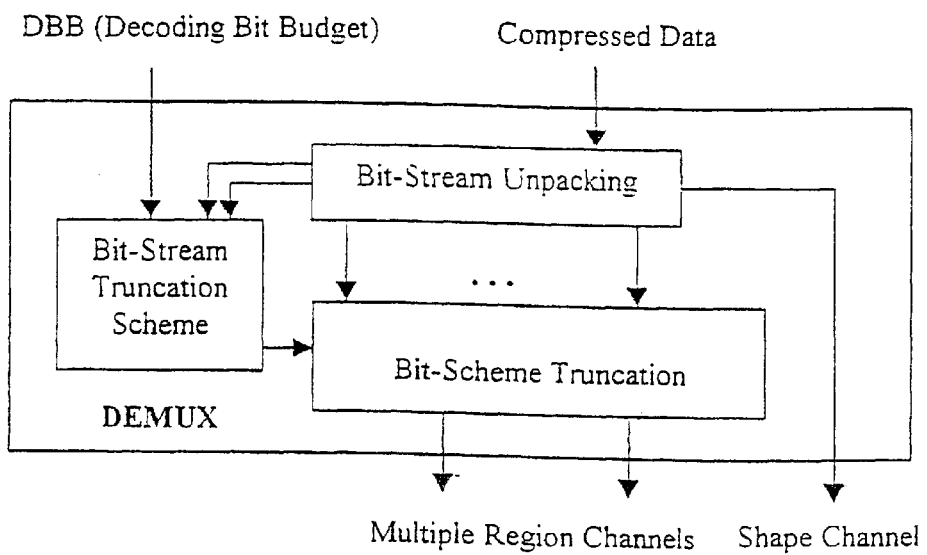
FIG. 13 is a flow diagram of the internal architecture of the de-multiplexer on the decompression side of the system.

To complement the multiplexer on the encoding side of the present system, a demultiplexing component is included on the decoding side of the present invention and is illustrated in FIG. 13. An added feature of the preferred embodiment of the present invention is the ability of the user at the decoding end of the system to determine their own bit budget and to perhaps truncate the data at an arbitrarly determined value. This "decoding bit budget" is determined before the demultiplexing step and is illustrated in FIG. 10.

Figure 14:
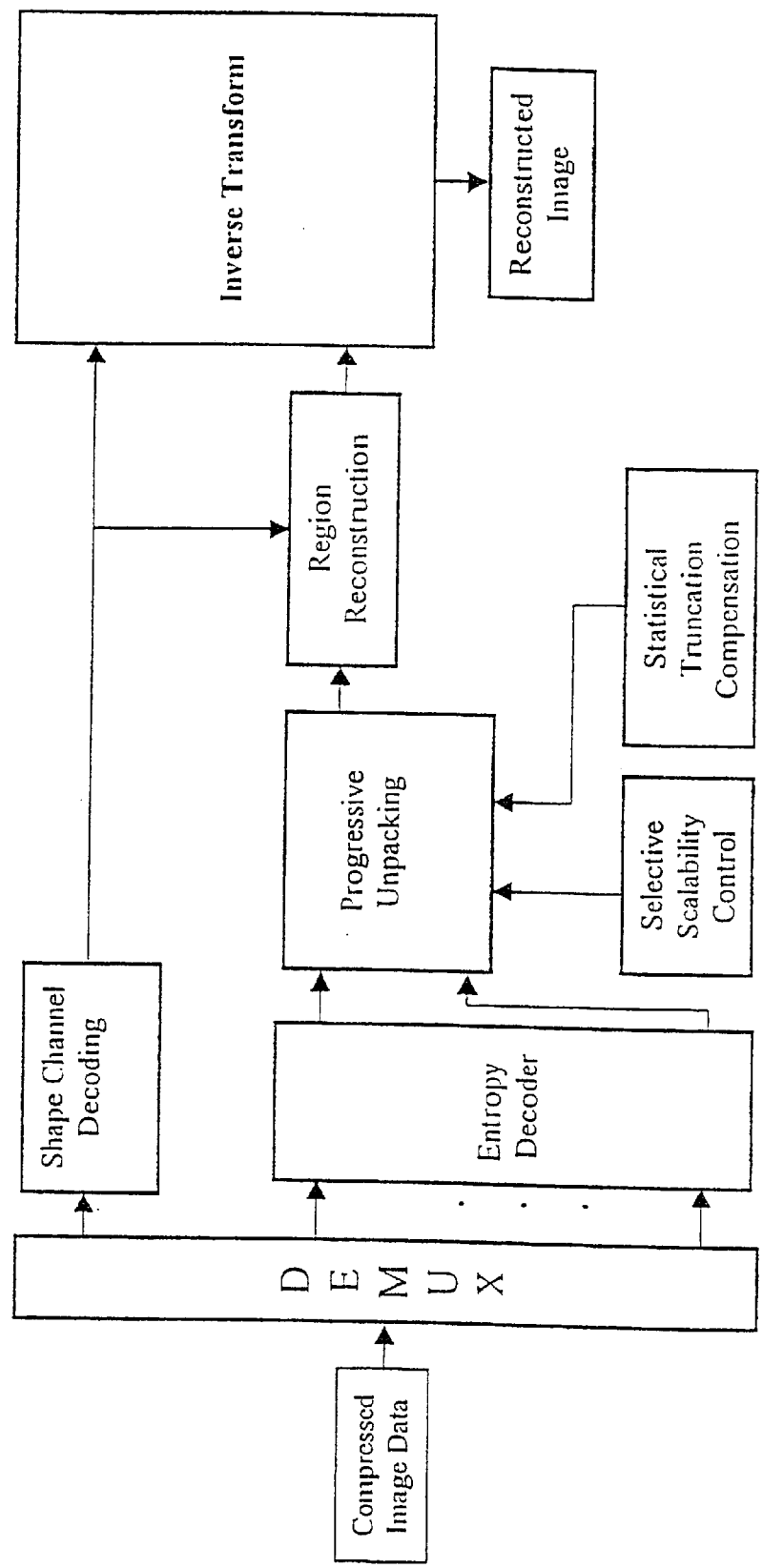
FIG. 14 is a detailed multi-path flow representation of the decompression system and architecture.

FIG. 14 illustrates the remainder of the decoding side of the present system. For the most part, the decoding process simply follows the reverse steps that occured on the encoding side of the system.

The functions of the demultiplexer (FIG. 14) are
(1) unpacking the compressed bit-stream into separated data lists; and
(2) applying the decoding bit-budget (DBB) to truncate the data lists. In order to provide the applications with a full spectrum of scalabilities in terms of spatial region, spatial resolution, pixel precision, and spatial orientation, a set of bit-budget control schemes are designed.

Various alterations, modifications and adaptations can be made to the embodiments of the present invention without departing from the scope of the invention, which is defined in the claims.

We claim:

1. A region-based method for encoding and decoding digital still images to produce a scalable, content accessible compressed bit stream comprising the steps:
    decomposing and ordering the raw image data into a hierarchy of multi-resolution sub-images;
    determining regions of interest;
    defining a region mask to identify regions of interest;
    encoding region masks for regions of interest
    determining region masks for subsequent levels of resolution; and
    scanning and progressively sorting the region data on the basis of the magnitude of the multi-resolution coefficients.

2. The method defined in claim 1, wherein the hierarchy of multi-resolution sub-images are composed on the basis of a wavelet transformation.

3. The method defined in claim 1, wherein the hierarchy of multi-resolution sub-images are composed on the basis of a Fourier-based transformation.

4. The method defined in claim 1, wherein the hierarchy of multi-resolution sub-images are composed using raw image data.

5. The method defined in claim 1, wherein regions of interest are determined by way of an automated process.

6. The method defined in claim 1, wherein regions of interest are determined by way of user definition.

7. The method defined in claim 1, wherein region masks are encoded on the basis of a fourier transformation.

8. The method defined in claim 1, wherein region masks are encoded on the basis of a wavelet transformation.

9. The method defined in claim 1, wherein region based data is scanned in a linear manner to create a list of multi-resolution coefficients.

10. The method defined in claim 1, wherein region based data is scanned using a region shrinking protocol to create a list of multi-resolution coefficients.

11. The method defined in claim 1, wherein the list of multi-resolution coefficients is sorted using, a progressive, partial sorting, regime.

12. The method defined in claim 1, wherein the list of multi-resolution coefficients is sorted using a progressive sorting, regime using data divided on the basis of an predetermined partition.

13. The method defined in claim 1, further comprising the step of a software switch determining the optimum method of entropy coding.

14. The method defined in claim 1, further comprising the step of a multiplexing protocol that assembles the compressed data from different region and resolution channels into an integrated bit-stream enabling, both the encoder and the decoder to selectively and interactively control the bit budget and the quality of the compressed images.

15. An apparatus for the region-based encoding and decoding of digital still images that produces a scalable, content accessible compressed bit stream comprising:
    a means of decomposing and ordering the raw image data into a hierarchy of multi-resolution sub-images;
    means of determining regions of interest;
    means of defining a region mask to identify regions of interest;
    means of encoding region masks for regions of interest;
    means of determining region masks for subsequent levels of resolution; and
    a means for scanning and progressively sorting, the region data on the basis of the magnitude of the multi-resolution coefficients.

16. The apparatus defined in claim 15, wherein the hierarchy of multi-resolution sub-images are composed using a wavelet transformation.

17. The apparatus defined in claim 15, wherein the hierarchy of multi-resolution sub-images are composed using a Fourier-based transformation.

18. The apparatus defined in claim 15, wherein the hierarchy of multi-resolution sub-images are composed using raw image data.

19. The apparatus defined in claim 15, wherein regions of interest are determined by way of an automated process.

20. The apparatus defined in claim 15, wherein regions of interest are determined by way of the user.

21. The apparatus defined in claim 15, wherein region masks are encoded using a fourier transformation.

22. The apparatus defined in claim 15, wherein region masks are encoded using a wavelet transformation.

23. The apparatus defined in claim 15, wherein region based data is scanned in a linear manner to create a list of multi-resolution coefficients.

24. The apparatus defined in claim 15, wherein region based data is scanned using a region shrinking protocol to create a list of multi-resolution coefficients.

25. The apparatus defined in claim 15, wherein the list of multi-resolution coefficients is sorted using a progressive, partial sorting regime.

26. The apparatus defined in claim 15, wherein the list of multi-resolution coefficients is sorted using a progressive sorting regime using data divided on the basis of an predetermined partition.

27. The apparatus defined in claim 15, that uses a software switch in determining the optimum means of entropy coding.

28. The apparatus defined in claim 15, further comprising a multiplexing means that assembles the compressed data from different region and resolution channels into an integrated bit-stream enabling both the encoder and the decoder to selectively and interactively control the bit budget and the quality of the compressed images.

29. A region-based system for encoding and decoding digital still images that produces a scalable, content accessible compressed bit stream and comprises the steps:
    decomposing and ordering the raw image data into a hierarchy of multi-resolution sub-images,
    determining regions of interest;
    defining a region mask to identify regions of interest;
    encoding region masks for regions of interest
    determining region masks for subsequent levels of resolution; and
    scanning and progressively sorting the region data on the basis of the magnitude of the multi-resolution coefficients.

* * * * *